United States Patent
Wu et al.

(10) Patent No.: US 6,536,467 B2
(45) Date of Patent: Mar. 25, 2003

(54) VALVE WITH INCREASED INLET FLOW

(75) Inventors: Samuel S. Wu, Houston, TX (US); George A. Hall, Kingwood, TX (US); Aziz J. Merchant, San Marcos, TX (US)

(73) Assignee: National-Oilwell, L.P., Houston, TX (US)

( * ) Notice: Subject to any disclaimer, the term of this patent is extended or adjusted under 35 U.S.C. 154(b) by 0 days.

(21) Appl. No.: 09/730,175

(22) Filed: Dec. 5, 2000

(65) Prior Publication Data

US 2002/0096217 A1 Jul. 25, 2002

(51) Int. Cl.⁷ .............................................. F16K 47/16
(52) U.S. Cl. ................... 137/543.19; 251/118
(58) Field of Search ...................... 137/543.19; 251/118, 251/123, 124

(56) References Cited

U.S. PATENT DOCUMENTS

| | | | | |
|---|---|---|---|---|
| 797,739 A | * | 8/1905 | Meer | 137/543.19 |
| 1,002,938 A | * | 9/1911 | Stange | 137/512.1 |
| 1,754,975 A | * | 4/1930 | Andersen | 137/123 |
| 1,938,418 A | * | 12/1933 | Evans | 137/543.19 |
| 3,457,949 A | * | 7/1969 | Coulter | 137/543.19 |
| 3,987,713 A | | 10/1976 | Larkfeldt et al. | 98/40 |
| 4,036,251 A | * | 7/1977 | Hartwick et al. | 137/512.1 |
| 4,149,563 A | | 4/1979 | Seger | 137/625.3 |
| 4,257,443 A | * | 3/1981 | Turney | 137/543.19 X |
| 5,065,790 A | * | 11/1991 | Kornas | 137/543.19 X |
| 5,170,946 A | | 12/1992 | Rankin | 239/590 |
| 5,193,577 A | | 3/1993 | De Koning | 137/516.29 |
| 5,249,600 A | | 10/1993 | Blume | 137/516.29 |
| 5,283,990 A | | 2/1994 | Shank, Jr. | 51/427 |
| 5,299,598 A | | 4/1994 | Quartana, III et al. | 137/540 |
| 5,398,500 A | | 3/1995 | Simpkin | 60/271 |
| 5,626,508 A | | 5/1997 | Rankin et al. | 451/102 |
| 5,664,733 A | | 9/1997 | Lott | 239/429 |
| 5,775,446 A | | 7/1998 | Lott | 175/424 |
| 5,964,446 A | * | 10/1999 | Walton et al. | 137/556 |

FOREIGN PATENT DOCUMENTS

FR            2471536      * 12/1979 ............ 137/543.19

OTHER PUBLICATIONS

Frank M. White, "Viscous Flow in Ducts", Fluid Mechanics, Second Edition, No. 314,, McGraw–Hill, Inc., 291, (1979).
Robert D. Blevins, "Applied Fluid Dynamics Handbook", Van Nostrand Reinhold Company, Inc., 136–143, (1984).
Vortex Ventures, Slide Surge Hopper, USPN 5,664,733.

* cited by examiner

Primary Examiner—John Rivell
(74) Attorney, Agent, or Firm—Conley Rose, P.C.

(57) ABSTRACT

A check valve having a profiled entrance that reduces net positive suction head for piston and plunger pumps. The valve inlet surface has a cross-section that may include a curved portion that corresponds to a portion of a cone, circle, ellipse, hyperbola, or parabola.

5 Claims, 7 Drawing Sheets

VALVE WITH INCREASED INLET FLOW

TECHNICAL FIELD OF THE INVENTION

The invention generally relates to check valves used in pumping operations. More specifically, the invention relates to a check valve with a profiled entrance for reducing net positive suction head for piston and plunger pumps.

BACKGROUND OF THE INVENTION

Check valves are devices that allow fluid to flow through a passageway in one direction but block flow in the reverse direction. The force of gravity and/or the action of a spring aids in closing the valve. FIG. 1 shows an example of a conventional check valve assembly. As shown therein, the major components of a check valve include: a valve body 16, a spring retainer 17, a valve 18, and biasing member 12 in compression between the valve and the spring retainer.

Check valves are used in a variety of applications, from regulating flow in HPLC machines to downhole drilling operations. Because check valves are used universally, in many types of media, they are prone to damage, including stuck or missing discs, backstop tapping, seat tapping, disc flutter, disc stud pin wear, hinge pin wear, and flow leakage. One of the major problems occurring with check valves without sufficient suction head(pressure), is cavitation.

Cavitation is the process in which a liquid changes to a vapor due to a reduction in pressure below liquid vapor pressure. Currently, almost all check valves for piston and plunger pumps have sharp corners at valve entrances or have a very small chamfer or radius, just enough to break the sharp corner. The result of this configuration is vena contracta. Vena contracta is defined as the contracted portion of a liquid jet at and near the orifice from which it issues. The fluid stream 50 shown in FIG. 2 contracting through a minimum diameter 51, is the prime mover for cavitation at check valve inlets. The sharp edges 52 in the entrance 53 cause flow separation, which results in non-recoverable pressure loss. Basically, the sudden increase in the velocity of the pumped liquid as fluid passes from a large flow area to a smaller flow area reduces the inlet pressure, sometimes below the liquid vapor pressure, resulting in the formation of gas and bubbles. The bubbles are caught up and swept upward along the inside cavity. Somewhere along the cavity, the pressure may once again drop below the vapor pressure and cause the bubbles to collapse. Implosions of these vapor pockets can be so rapid that a rumbling/cracking noise is produced. The hydraulic impacts of the shock waves caused by the collapsing bubbles are strong enough to cause minute areas of fatigue on the metal piston or plunger surfaces. Depending on the severity of the cavitation, a decrease in pump performance may also be noted. Cavitation damage to the pump may range from minor pitting to catastrophic failure and depends on the pumped fluid characteristics, energy levels, and duration of cavitation.

Thus, if the suction head of a given pump, namely the energy per lb. (due to pressure, velocity or elevation) required by a liquid to remain a fluid, cannot be raised above the vaporization line by decreasing the temperature or increasing the pressure, cavitation will occur. Cavitation often occurs on pumps in offshore platforms due to space constraints; there is not room available for equipment to house large flow regions, which would allow for minimal pressure reduction, thereby reducing the risk of cavitation. Instead, the equipment promotes small flow regions with many pressure drops, leading to frequent cavitation and premature damage of fluid end components.

The first reaction to a cavitation problem is typically to check the net positive suction head available (NPSHa), measured at the suction flange, and compare it to the net positive suction head required (NPSHr). The NPSHa is a characteristic of the system and is defined as the energy which is in a liquid at the suction connection of the pump over and above that energy in the liquid due to its vapor pressure. The NPSHr is a characteristic of the pump design. It is determined by test or computation and is the energy needed to fill a pump on the suction side and overcome the friction and pressure losses from the suction connection to that point in the pump at which more energy is added; the NPSHr is the minimum head required to prevent cavitation with a given liquid at a given flowrate. The ratio of NPSHa/NPSHr must be sufficiently large to prevent formation of cavitation bubbles.

Normally, the NPSHr plotted on the traditional pump curve is based on a 3% head loss due to cavitation, a convention established many years ago in the Hydraulic Institute of Standards. Permitting a head loss this large means that at some higher flow condition cavitation would already have begun before performance loss was noticed.

For this reason, it is imperative that a margin be provided between the NPSHr and the NPSHa at the desired operating conditions. Further, the NPSHr will actually tend to increase with a reduction in flow.

A reasonable margin of 8 ft of water at rated flow rate is commonly accepted by end users for most services. For known problem applications, such as vacuum tower bottoms and some solvents, this margin is often increased to 10 ft.

BRIEF SUMMARY OF THE INVENTION

The present invention is a check valve that includes a profiled entrance for reducing net positive suction head required. Profiled is defined as being shaped into a particular, predetermined form to streamline flow and minimize vena contracta. The profiled entrance offers an improvement over traditional sharp-cornered entrances by allowing the nozzle to require a lower pressure at the same flow rate. By requiring a lower inlet pressure, the total pressure loss in the pump is reduced, which in turn, reduces the net positive suction head required.

BRIEF DESCRIPTION OF THE DRAWINGS

For a more detailed understanding of the present invention, reference is made to the following Figures, wherein.

DETAILED DESCRIPTION OF THE PREFERRED EMBODIMENTS

Figure 1:
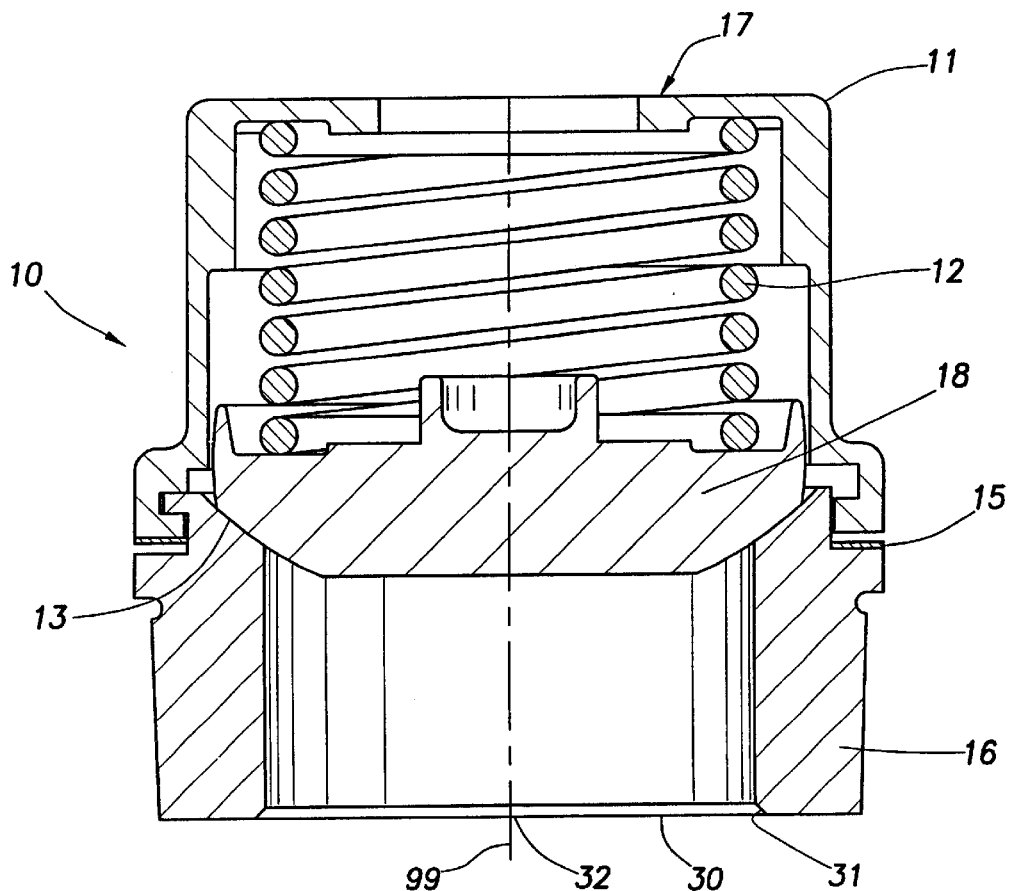
FIG. 1 is a schematic representation of a typical, check valve with a sharp-cornered entrance (prior art).
Figure 2:
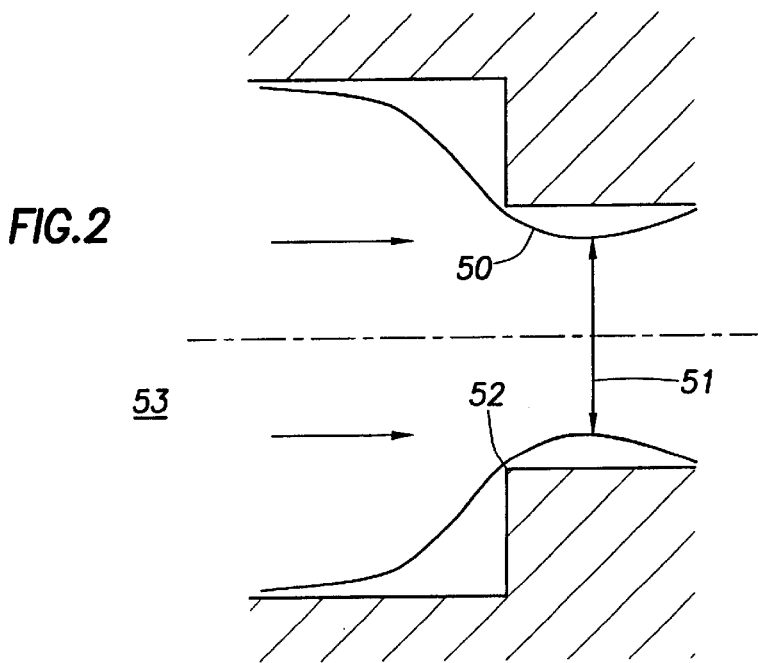
FIG. 2 is a schematic representation of vena contracta.

FIG. 1 is a cross-section of a check valve assembly 10 containing: a valve body 16 having a bore therethrough, the bore having an inlet 30 and an outlet 11, a valve 18 engaging body 16 at outlet 11, a spring retainer 17 engaging body 16 and surrounding valve 18 and outlet 11, a valve seat 13; a first biasing member 12 in compression between body 16 and spring retainer 17; and a second biasing member 15 in compression between body 16 and valve 18. The prior art typically has a small chamfer 31 in the valve body at the inlet 30. Valve assembly 10 has a longitudinal axis 99.

The valve is designed to open and allow fluid passage when the force of the working fluid in the positive flow direction 32 exceeds the compressive load of biasing member 12 (shown as a coil spring), which maintains valve 18 against valve seat 13. If the flow pressure decreases or reverses in direction, biasing spring 12 will act to close valve 18 against valve seat 13 and prevent reverse fluid flow.

FIGS. 3–6, 8, 10, and 12 are alternative embodiments of check valves in accordance with the present invention. The check valves include all the components of FIG. 1, except chamfer 31 in the valve body at inlet 30. In each embodiment, the valve body at inlet 30 has been modified to minimize vena contracta.

Figure 3:
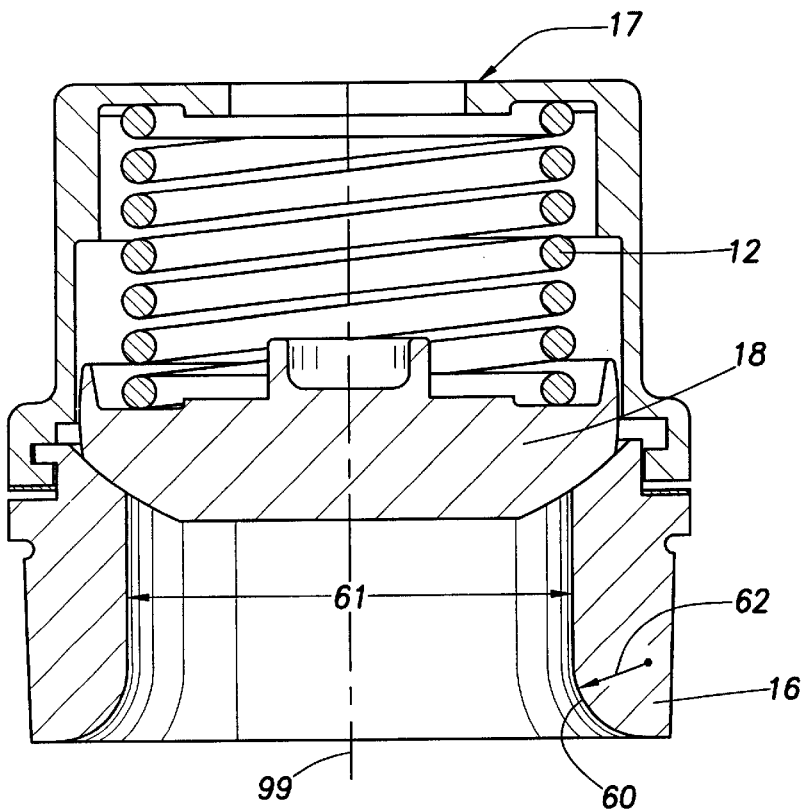
FIG. 3 is an assembly drawing of a check valve constructed in accordance with a preferred embodiment, having a rounded entrance, single radius.

FIG. 3 is a cross-section of a check valve assembly with a rounded inlet surface 60 and an inlet diameter 61. Inlet surface 60 has a single radius of curvature 62. The radius of curvature 62 is preferably limited by R≧0.05 D, where R is radius 62 and D is diameter 61.

Figure 4:
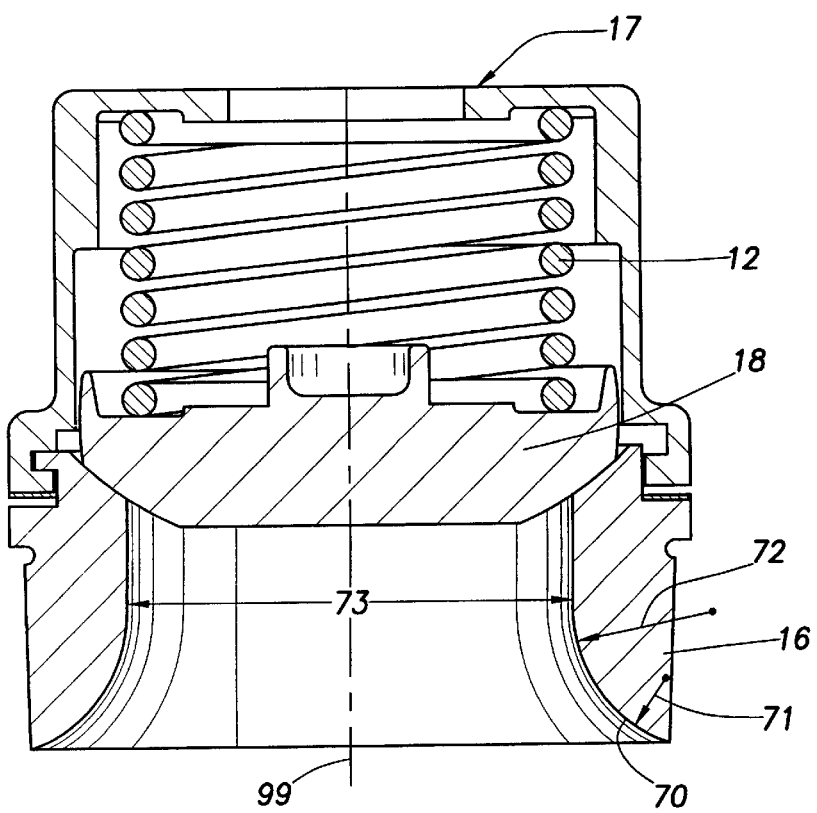
FIG. 4 is an assembly drawing of a first alternative embodiment of the present check valve, having a rounded entrance, double radii.

FIG. 4 is a cross-section of a check valve assembly with a curved inlet surface 70 and a diameter 73. Curved inlet surface 70 is a continuous curve having a radius of curvature that ranges from radius of curvature 71 to radius of curvature 72. The radii 71 and 72 are preferably each limited by R≧0.05D, where R is radius 71 or 72 and D is diameter 73.

Figure 5:
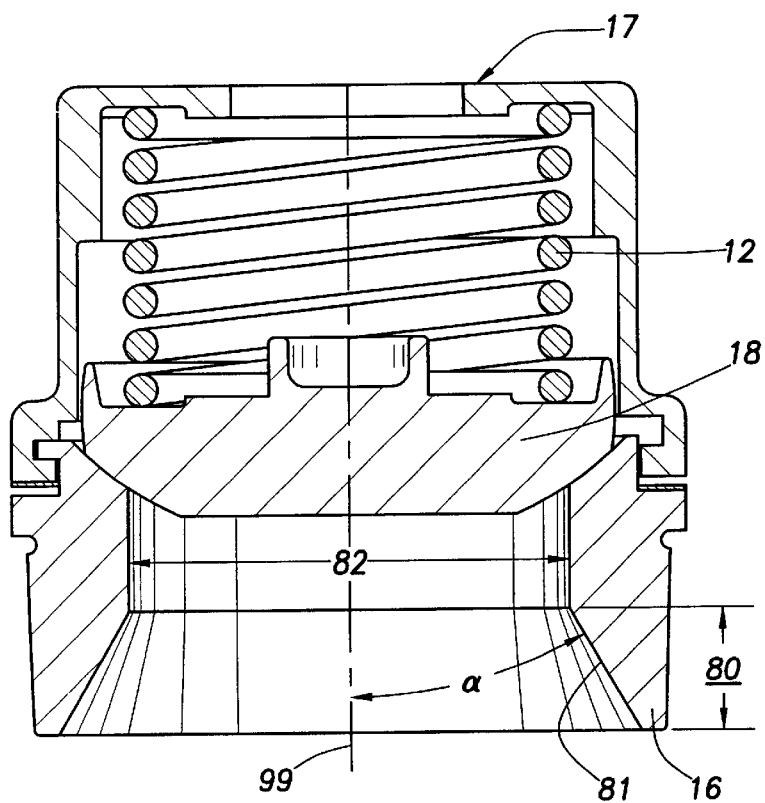
FIG. 5 is an assembly drawing of a second alternative embodiment of the present check valve, having a conical entrance.

FIG. 5 is a cross-section of a check valve assembly with a frustoconical inlet surface 81 having a height 80 and an inner diameter 82. An angle α is defined between surface 81 and axis 99 and is preferably between 10° and 75°. The ratio of height 80 to inner diameter 82 is preferably greater than 0.05.

Figure 6:
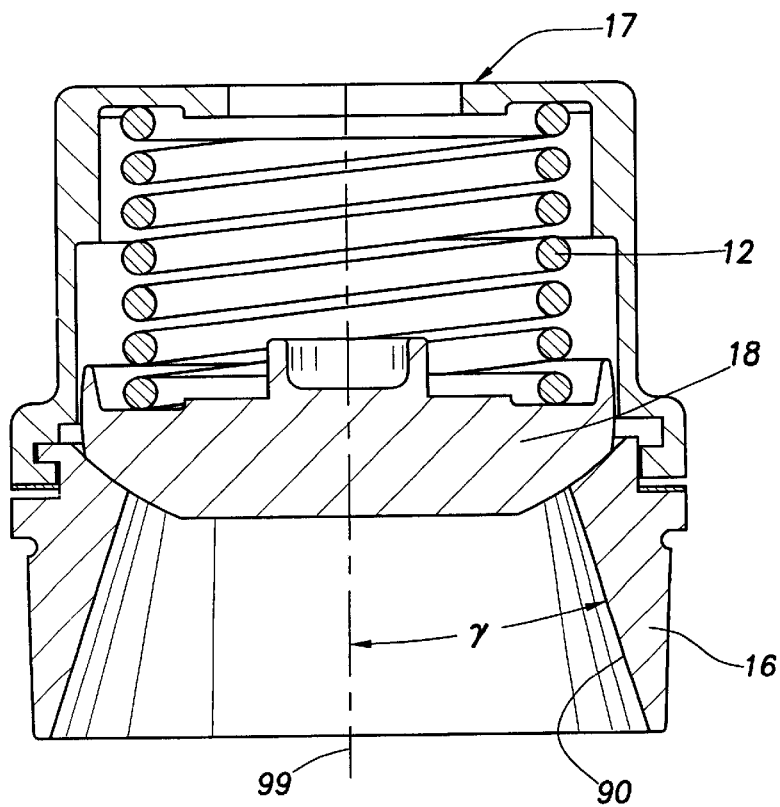
FIG. 6 is an assembly drawing of a third alternative embodiment of the present check valve, having a taper entrance.

FIG. 6 is a cross-section of a check valve assembly with a tapered inlet having a frustoconical inlet surface 90. Unlike surface 80 in FIG. 5, surface 90 extends inward all the way to valve disk 18. An angle γ is defined between surface 90 and axis 99 and is preferably between 5° and 75°.

Figure 7:
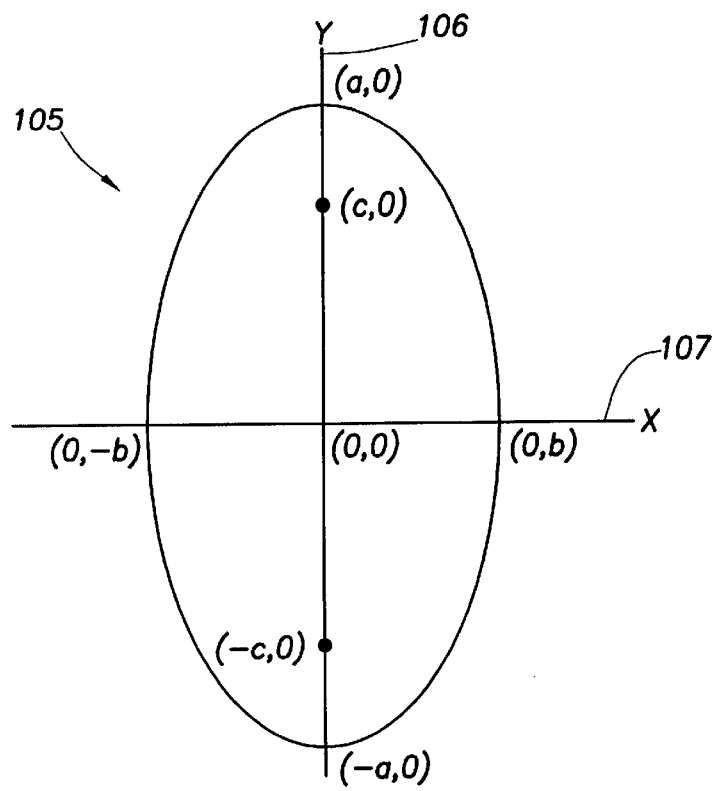
FIG. 7 is a representative drawing of an ellipse.

FIG. 7 is a cross-section of a representative ellipse 105. Ellipse 105 is vertical and defined by the equation $y^2/a^2 + x^2/b^2 = 1$ wherein a is a value on major axis 106 and b is a value on minor axis 107. For an ellipse having its center at the origin (0, 0), the foci c are defined by $a^2 - b^2 = c^2$. The major axis is on the y-axis and has a length of 2a. The minor axis is on the x-axis and has a length of 2b. The foci are located at (0, c) and (0, −c). The vertices are at (0, a) and (0, −a). The convertices are at (b, 0) and (−b, 0).

Figure 8:
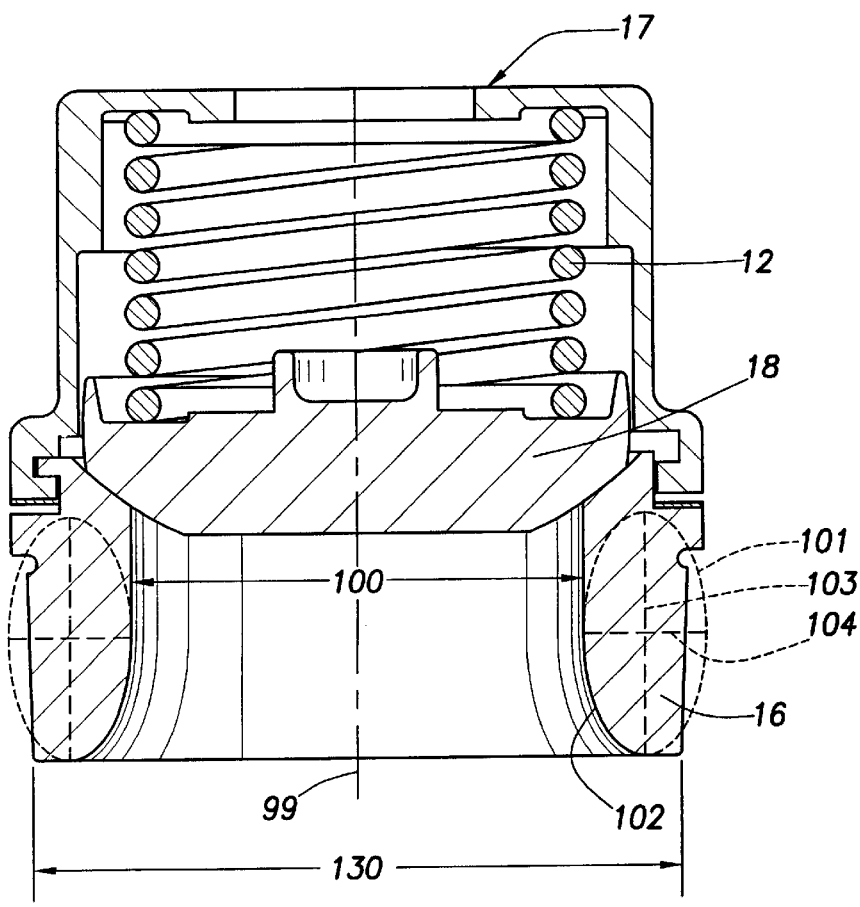
FIG. 8 is an assembly drawing of a fourth alternative embodiment of the present check valve, having an elliptical entrance.

FIG. 8 is a cross-section of a check valve assembly wherein the cross-section of inlet mouth 102 is defined by one quadrant of an ellipse 101. The inlet mouth has an inner diameter, d, 100 and an outer diameter, D, 130. Ellipse 101 is defined by the same equation as ellipse 105 of FIG. 7. Thus, ellipse 101 is characterized by major and minor axis 103 and 104, respectively, of which major axis 103 is parallel to inlet axis 99. In a preferred embodiment, 103 is ≧0.05D and 104 is ≧0.05(D-d) and 0.05d.

Figure 9:
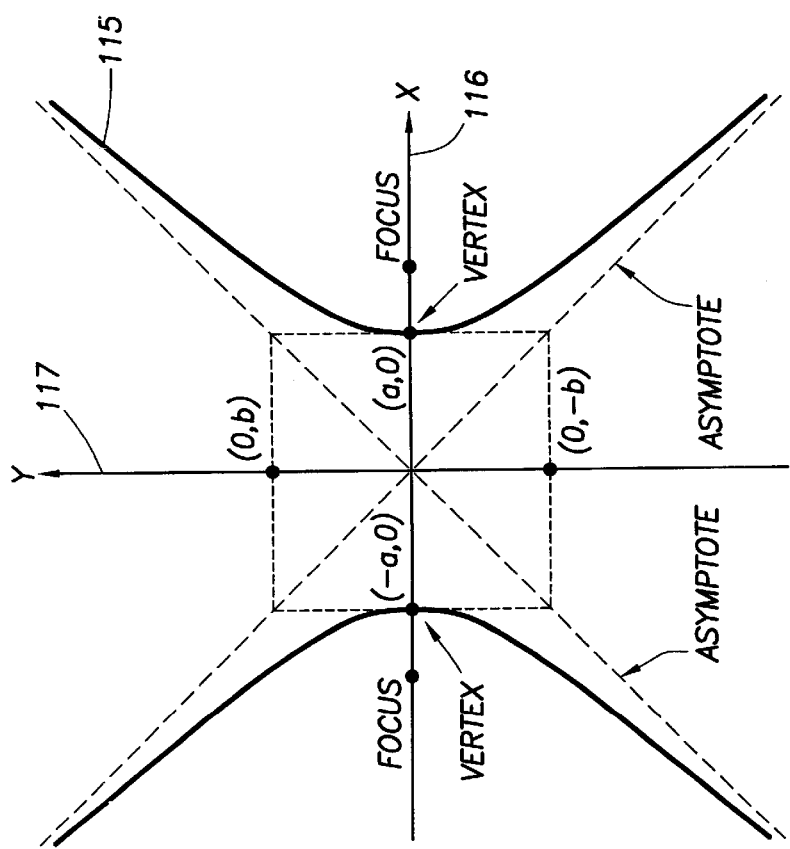
FIG. 9 is a representative drawing of a hyperbola.

FIG. 9 shows a representative hyperbola 115. Hyperbola 115 is vertical and defined by equation $x^2/a^2 - y^2/b^2 = 1$ wherein a is a value on transverse axis 116, b is a value on conjugate axis 117. The center is at point (0, 0). The asymptotes are at y=(b/a)x and (−b/a)x. The vertices are at (a, 0) and (−a, 0). The foci are at (c, 0) and (−c, 0) where a, b, and c are related by $c^2 = a^2 + b^2$. The transverse axis is on the x-axis and has a length of 2a. The conjugate axis is on the y-axis and has a length of 2b.

Figure 10:
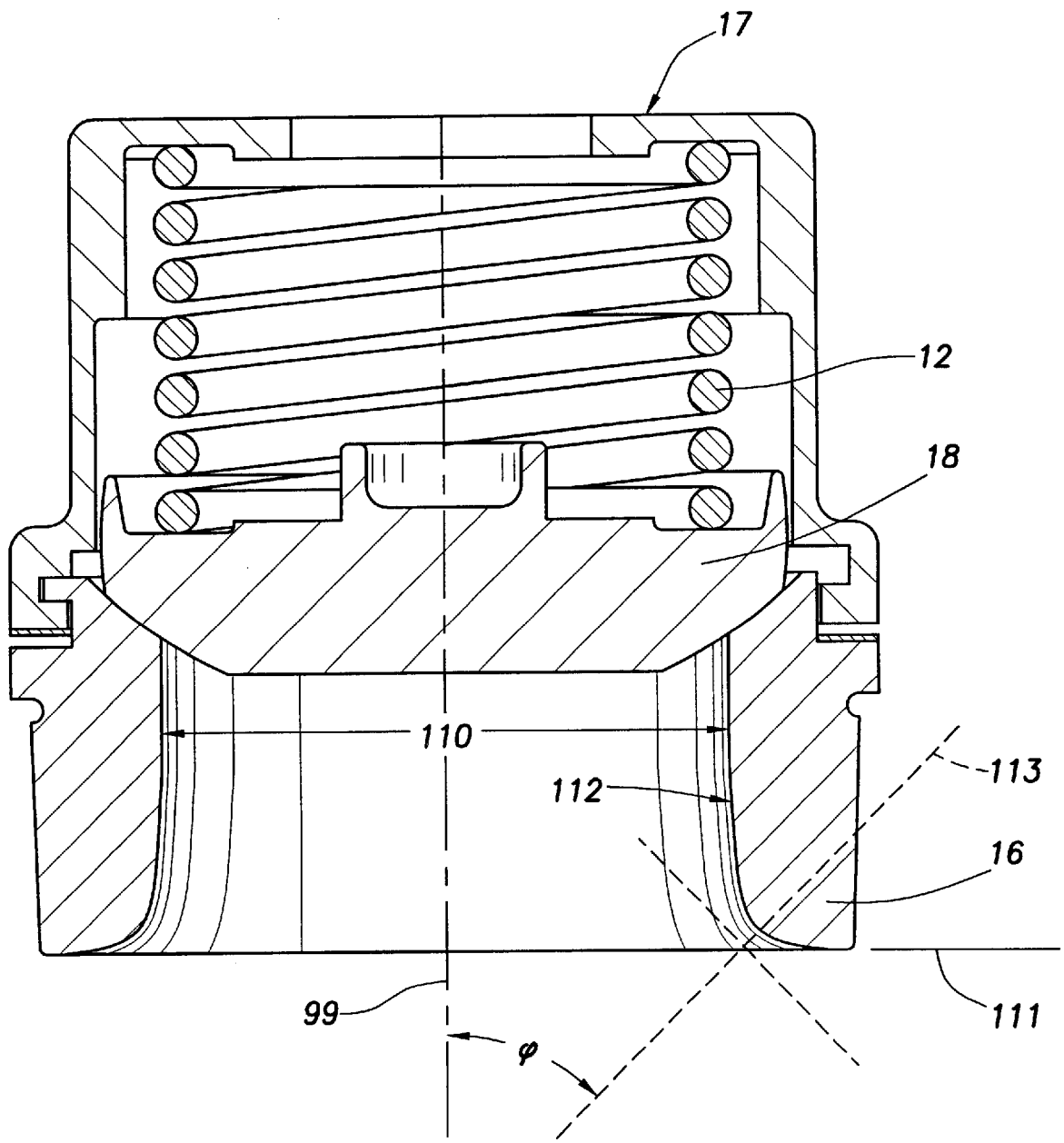
FIG. 10 is an assembly drawing of a fifth alternative embodiment of the present check valve, having a hyperbolic entrance.

FIG. 10 is a cross-section of a check valve assembly wherein the cross-section of inlet mouth 112 is defined by a portion of hyperbola 111 and the inlet mouth has an inner diameter, D, 110. Hyperbola 111 is defined by the same equation as hyperbola 115 of FIG. 9 and is positioned such that transverse axis 113 defines an angle φ with respect to the inlet axis 99. In the embodiment shown φ is 45°. In other preferred embodiments, φ is preferably between 0° and 90° and a and b are ≧0.01D.

Figure 11:
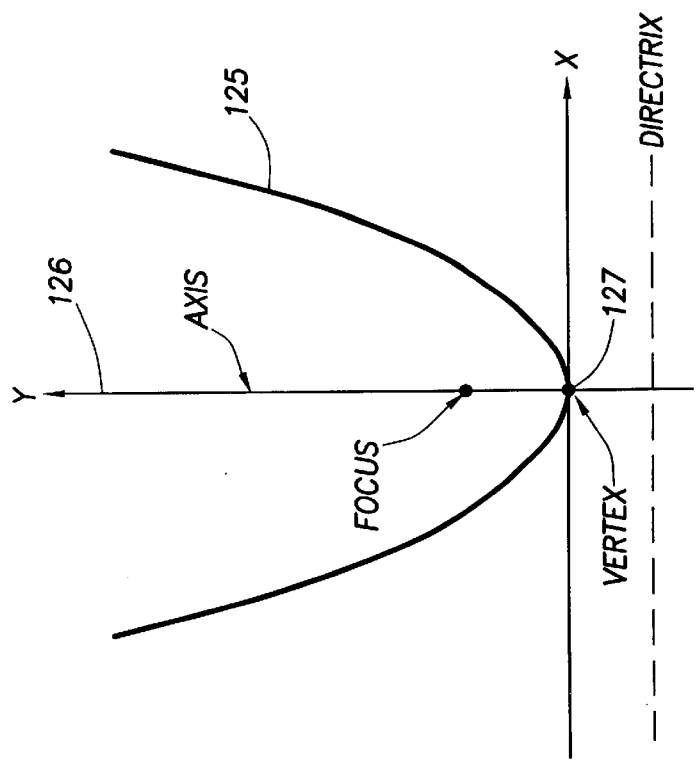
FIG. 11 is a representative drawing of a parabola.

FIG. 11 shows representative parabola 125. Parabola 125 is vertical and defined by the equation x=4py wherein p is the focus of the parabola located on the y-axis 126. The vertex 127 is located at point (0, 0). The focus is at (0, p). The directrix is at y=−p. The quantity 4p is known as the latus rectum 4p.

Figure 12:
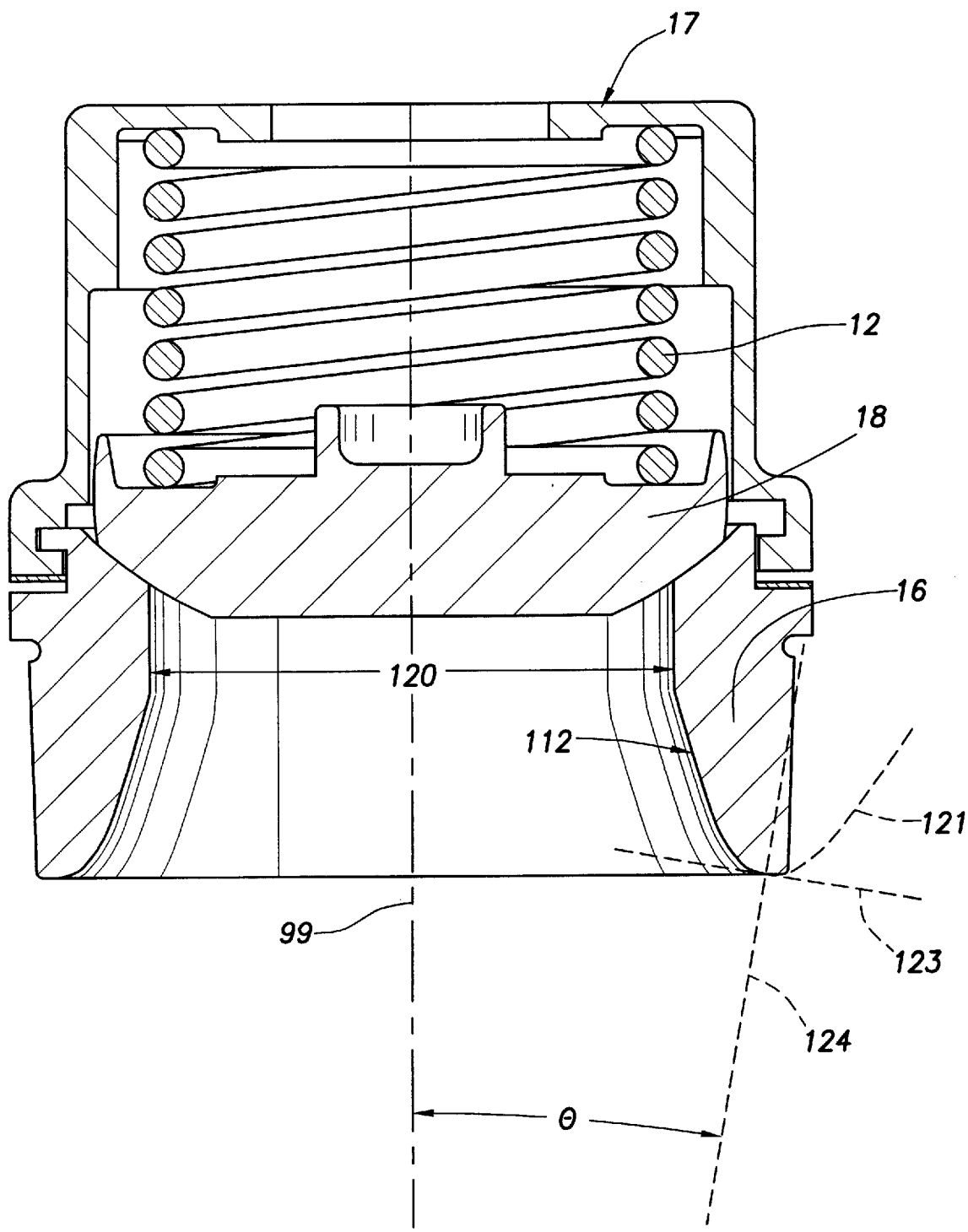
FIG. 12 is an assembly drawing of a sixth alternative embodiment of the present check valve, having a paraboloidal entrance.

FIG. 12 is a cross-section of a check valve assembly wherein the cross-section of inlet mouth 123 is partially defined by a portion of a parabola 121 and has an inner diameter, D, 120. In the embodiment shown, the inlet surface defines one-half of parabola 121. Parabola 121 is defined by the same equation as parabola 125 of FIG. 11 and is characterized by y-axis 124 and x-axis 123. In a preferred embodiment, y-axis 124 is parallel to inlet axis 99. In other embodiments, y-axis 124 can be at an angle of from 0° to 90° degrees with respect to inlet axis 99, and p is ≧0.01D.

Reducing the pressure loss due to vena contracta is advantageous for a number of reasons. First of all, by profiling the body of the valve at the inlet, the change in velocity of the pumped liquid as fluid passes from a large flow area to a smaller flow is reduced. This is because the liquid undergoes a gradual flow change, which results in a smaller reduction in the inlet pressure. If the change in the inlet pressure is kept to a minimum, the required pump suction head will be met, and cavitation cannot occur.

In order to prove that pressure loss due to vena contracta can be reduced by simply changing the shape of the valve body at the inlet, the following experiments were conducted using nozzles. A check valve inlet in a pump can be viewed as a nozzle because the valve seat is short and the through bore diameter is smaller than the fluid end chamber diameter.

EXAMPLE 1

Experiment

Nozzles were made to ⅛ scale of the actual valve size to determine profiled inlet's effects on pressure and through flow volume. The new profile selected was the rounded inlet with a single radius, shown in FIG. 3.

Results: Flow Rate

Some of the test results are shown on Table 1. It is clear that more flow goes through the nozzle with the new profiled inlet than the nozzle with the standard sharp corner inlet at the same pressure. On average, there is a 27.4% increase in fluid flow at an average 25.33 gpm through the new profiled inlet, as compared to the standard inlet.

Results: Pressure

Still looking at Table 1, it is clear that lower pressure is required by the profiled inlet nozzle than the standard nozzle at the same flow rate. On average, there is a 34.9% reduction in pressure loss at an average 12.83 gpm through the new profiled inlet, as compared to the standard inlet.

TABLE 1

|  | Flow Rate @ 30 psi | Flow Rate @ 26 psi | Flow Rate @ 20 psi | Pressure @ 12.22 gpm | Pressure @ 13.44 gpm |
| --- | --- | --- | --- | --- | --- |
| Standard | 13.06 gpm | 12.07 gpm | 10.57 gpm | 26 psi | 32 psi |
| New Profile | 16.46 gpm | 15.32 gpm | 13.67 gpm | 16 psi | 20 psi |
| Improvement | 26.0% | 26.9% | 29.3% | 38.5% | 31.3% |

EXAMPLE 2

Experiment

Based on the results from Experiment 1, valves were made to actual size with new profile inlets, and tested in a pump driven by an engine to determine the profiled inlet's effect on cavitation.

Results: Cavitation

Results are shown on Table 2. With a standard valve, the pump starts to cavitate at an engine speed of 1450 rpm, and is severely cavitating at 1500 rpm. However, with a new profiled valve, the pump starts to cavitate at 1550 rpm and only slightly cavitates above 1550 rpm.

TABLE 2

|  | Engine Speed (rpm) | Observations |
| --- | --- | --- |
| Standard | 1450 | Starts to cavitate at 1450 rpm; at 1500 rpm, very bad cavitation |
| New Profile | 1550 | Starts to cavitate at 1550 rpm |

The embodiments described herein are exemplary only, and are not limiting. Many variations and modifications of the invention and the principles discussed herein are possible and are within the scope of the invention. Accordingly, the scope of protection is not limited by the description set out above, but is only limited by the claims that follow, that scope including all equivalents of the subject matter of the claims.

What is claimed is:

1. A check valve for controlling the flow of liquid under high pressure, wherein the valve comprises:
   a valve body having a bore therethrough, said bore having an inlet and an outlet;
   a valve engaging said body at said outlet;
   a spring retainer engaging said body and surrounding said valve and said outlet; and
   a biasing member in compression between said valve and said spring retainer;
   wherein a cross-section of the leading edge of said inlet defines a rounded portion having two convex radii or curvature.

2. The check valve assembly of claim 1 wherein said radii are defined by a relationship with the diameter of the bore according to the equation $R \geq 0.05D$, where R is the radius of both rounded segments of the entrance and D is the diameter of the bore.

3. A check valve for controlling the flow of liquid under high pressure, wherein the valve comprises:
   a valve body having a bore therethrough, said bore having an inlet and an outlet;
   a valve engaging said body at said outlet;
   a spring retainer engaging said body and surrounding said valve and said outlet; and
   a biasing member in compression between said valve and said spring retainer;
   wherein a cross-section of the leading edge of said inlet defines a portion of an ellipse.

4. A check valve for controlling the flow of liquid under high pressure, wherein the valve comprises:
   a valve body having a bore therethrough, said bore having an inlet and an outlet;
   a valve engaging said body at said outlet;
   a spring retainer engaging said body and surrounding said valve and said outlet; and a biasing member in compression between said valve and said spring retainer;

wherein a cross-section of the leading edge of said inlet defines a portion of a hyperbola.

5. A check valve for controlling the flow of liquid under high pressure, wherein the valve comprises:

a valve body having a bore therethrough, said bore having an inlet and an outlet;

a valve engaging said body at said outlet;

a spring retainer engaging said body and surrounding said valve and said outlet; and a biasing member in compression between said valve and said spring retainer;

wherein a cross-section of the leading edge of said inlet defines a rounded portion of a parabola.

* * * * *